(12) United States Patent
Kim

(10) Patent No.: US 10,974,602 B2
(45) Date of Patent: Apr. 13, 2021

(54) BRAKE APPARATUS FOR VEHICLES

(71) Applicant: HYUNDAI MOBIS CO., LTD., Seoul (KR)

(72) Inventor: Jong Sung Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 16/507,961

(22) Filed: Jul. 10, 2019

(65) Prior Publication Data

US 2020/0016983 A1    Jan. 16, 2020

(30) Foreign Application Priority Data

Jul. 11, 2018   (KR) .................. 10-2018-0080771

(51) Int. Cl.
| | | |
|---|---|---|
| *B60T 8/64* | (2006.01) | |
| *B60L 7/18* | (2006.01) | |
| *B60T 13/66* | (2006.01) | |
| *B60L 7/26* | (2006.01) | |

(52) U.S. Cl.
CPC ....... *B60L 7/18* (2013.01); *B60L 7/26* (2013.01); *B60T 13/662* (2013.01); *B60T 2270/604* (2013.01)

(58) Field of Classification Search
CPC ............... B60T 2270/604; B60T 2270/602
See application file for complete search history.

(56) References Cited

U.S. PATENT DOCUMENTS

| | | | | |
|---|---|---|---|---|
| 5,253,929 A * | 10/1993 | Ohori | .............. | B60T 7/042 |
| | | | | 188/156 |
| 5,433,512 A * | 7/1995 | Aoki | .............. | B60L 7/10 |
| | | | | 180/165 |
| 6,070,954 A * | 6/2000 | Urababa | .............. | B60L 7/26 |
| | | | | 188/156 |
| 9,352,734 B2 * | 5/2016 | Ossyra | .............. | B60T 1/10 |
| 2009/0108672 A1 * | 4/2009 | Joyce | .............. | B60L 7/26 |
| | | | | 303/152 |
| 2011/0285200 A1 * | 11/2011 | Hatano | .............. | B60T 13/686 |
| | | | | 303/6.01 |
| 2011/0304198 A1 * | 12/2011 | Cottrell, V | .............. | B60T 1/10 |
| | | | | 303/2 |
| 2019/0100186 A1 * | 4/2019 | Jeong | .............. | B60T 8/4081 |

FOREIGN PATENT DOCUMENTS

KR      10-2008-0024651 A      3/2008

* cited by examiner

*Primary Examiner* — Nicholas J Lane
(74) *Attorney, Agent, or Firm* — Knobbe Martens Olson & Bear LLP

(57) ABSTRACT

A brake apparatus for vehicles may include: a regenerative brake unit configured to perform a regenerative braking operation of a rear-wheel-drive vehicle; a master cylinder configured to form master braking hydraulic pressure using an operation of an actuator to apply, to front wheels and rear wheels of the rear-wheel-drive vehicle, frictional braking force determined by subtracting regenerative braking force generated by the regenerative brake unit from braking force demanded by a driver; and a valve unit configured to adjust the master braking hydraulic pressure formed by the master cylinder so that the frictional braking force is differentially applied to the front wheels and the rear wheels, and to restrict braking force for the rear wheels from being increased by regenerative braking force applied to the rear wheels.

9 Claims, 6 Drawing Sheets

BRAKE APPARATUS FOR VEHICLES

CROSS-REFERENCES TO RELATED APPLICATIONS

The present application claims priority to Korean application number 10-2018-0080771, filed on Jul. 11, 2018 which is incorporated by reference in its entirety.

BACKGROUND OF THE INVENTION

The present invention relates to a brake apparatus for vehicles, and more particularly, to a brake apparatus for vehicles capable of controlling braking force of vehicle wheels during cooperative control between frictional braking and regenerative braking in a rear-wheel-drive vehicle.

Typically, vehicles which are driven by engines employ a lot of parts, including not only an engine, a transmission, a drive shaft, and a hydraulic brake, but also other engine-related apparatuses such as a fuel supply apparatus, an intake and exhaust apparatus, a cooling and lubricating apparatus, and a dustproof apparatus. Such vehicles cause a problem of air pollution due to exhaust gas.

To solve the foregoing problem, vehicles provided with electric motors, e.g., hydrogen fueled vehicles, next-generation vehicles using fuel cells or solar energy, and so forth have been currently developed. Recently, regenerative braking methods for improving fuel efficiency have been employed as a braking method for vehicles provided with electric motors. The term "regenerative braking" means an operation of braking a vehicle while absorbing, using an electric motor, inertial force of the vehicle that intends to move forward when the vehicle brakes. Energy resulting from counter electromotive force generated by the electric motor is stored in a battery.

Braking force generated by regenerative braking, in other words, regenerative braking force, is limited in amount depending on driving conditions, such as a vehicle speed or a battery-charged state, of the vehicle. Thus, the regenerative braking force may not meet the entirety of braking force demanded as a driver steps on a brake pedal, and the amount of regenerative braking force may be variable. Therefore, there has been proposed a regenerative braking cooperative control technique in which active control of varying frictional braking force depending on varying regenerative braking force is performed so that the sum of the frictional braking force and the regenerative braking force corresponds to the braking force demanded by the driver.

To implement such regenerative braking cooperative control, electric booster braking systems are being expanded. Generally, an electric booster braking system maintains the majority of braking mechanism of the existing vacuum booster, but there is a difference in boosting mechanism therebetween in that, unlike the vacuum booster of boosting braking hydraulic pressure using a difference between air pressure and vacuum pressure, the electric booster braking system boosts the braking hydraulic pressure with the force of an electric booster (i.e., a motor) using electric energy.

With regard to a braking operation of a vehicle, in terms of attitude stability of the vehicle, the case where lock occurs on rear wheels is much more dangerous than the case where lock occurs on front wheels. Therefore, a braking system is typically designed such that rear wheel lock occurs after front wheel lock, and is operated to perform automatic control such as ABS. Consequently, to secure the attitude stability of the vehicle, there is a need to limit braking force to be applied the rear wheels instead of braking force to be applied to the front wheels.

Thus, in the case where the above-mentioned regenerative braking cooperative control is applied to a front-wheel-drive electric vehicle (EV), even if braking force to be applied to the front wheels becomes higher than that to be applied to the rear wheels by simultaneously increasing or reducing the braking pressure to be applied to the four wheels, there is seldom a problem in terms of the attitude stability of the vehicle.

However, in the case where the regenerative braking cooperative control is applied to a rear-wheel-drive electric vehicle (EV), because braking force corresponding to frictional braking force is applied to the front wheels and the sum of frictional braking force and regenerative braking force is applied to the rear wheels, the probability of occurrence of wheel lock in the rear wheels is increased, so that the attitude stability of the vehicle deteriorates.

The related art of the present invention is disclosed in Korean Patent Application Laid-Open No. 10-2008-0024651 published on Mar. 19, 2008.

SUMMARY OF THE INVENTION

Embodiments of the present invention are directed to a brake apparatus for vehicles capable of preventing the attitude stability of the vehicle from deteriorating due to an increase in braking force to be applied to rear wheels in a rear-wheel-drive vehicle to which regenerative braking cooperative control is applied.

In one embodiment, a brake apparatus for vehicles including: a regenerative brake unit configured to perform a regenerative braking operation of a rear-wheel-drive vehicle; a master cylinder configured to form master braking hydraulic pressure using an operation of an actuator to apply, to front wheels and rear wheels of the rear-wheel-drive vehicle, frictional braking force determined by subtracting regenerative braking force generated by the regenerative brake unit from braking force demanded by a driver; and a valve unit configured to adjust the master braking hydraulic pressure formed by the master cylinder so that the frictional braking force is differentially applied to the front wheels and the rear wheels, and to restrict braking force for the rear wheels from being increased by regenerative braking force applied to the rear wheels.

The valve unit may restrict the braking force of the rear wheels such that preset braking distribution conditions are satisfied, taking into account a ratio between the frictional braking force to be applied to the front wheels and the braking force of the rear wheels obtained by a sum of the regenerative braking force and the frictional braking force to be applied to the rear wheels.

In a pressure-increased state of the master cylinder, when the master braking hydraulic pressure is within a range equal to or less than a preset reference hydraulic pressure, the valve unit may block braking hydraulic pressure from being supplied to wheel cylinders of the rear wheels, so that the master braking hydraulic pressure is supplied to only wheel cylinders of the front wheels, and when the master braking hydraulic pressure exceeds the reference hydraulic pressure, the valve unit may allow braking hydraulic pressure to be supplied to the wheel cylinders of the rear wheels within a range in which a difference between the reference hydraulic pressure and the master braking hydraulic pressure supplied to the wheel cylinders of the front wheels remains constant.

The valve unit may be installed on a flow path extending from the master cylinder to the wheel cylinders of the rear wheels, and be a normal close type valve which opens while a return spring is compressed when the master braking hydraulic pressure exceeds the reference hydraulic pressure.

The valve unit may include a check valve configured to form a pressure reducing path for retrieving brake oil into the master cylinder in a pressure-reduced state of the master cylinder.

The brake apparatus may further include a controller configured to control the operation of the actuator, based on information about relationship between a supply rate of brake oil supplied from the master cylinder for braking and entire braking force to be applied to the front wheels and the rear wheels. The controller may control the operation of the actuator, taking into account a difference between first relationship information obtained by measuring the relationship information in the pressure-increased state of the master cylinder and second relationship information obtained by measuring the relationship information in the pressure-reduced state of the master cylinder, the difference being caused by an invalid stroke of the master cylinder.

The controller may control the operation of the actuator based on the first relationship information until the master braking hydraulic pressure increases and reaches the reference hydraulic pressure, and control the operation of the actuator based on the second relationship information after the master braking hydraulic pressure exceeds the reference hydraulic pressure.

The valve unit may include a rear-wheel inlet valve configured to control braking hydraulic pressure to be supplied to the wheel cylinders of the rear wheels. The brake apparatus may further include a controller configured to control an operation of the rear-wheel inlet valve to adjust the braking hydraulic pressure to be supplied to the wheel cylinders of the rear wheels, and to restrict the braking force of the rear wheels from being increased by regenerative braking force to be applied to the rear wheels.

In a pressure-increased state of the master cylinder, when the master braking hydraulic pressure is within a range equal to or less than a preset reference hydraulic pressure, the controller may close the rear-wheel inlet valve to block braking hydraulic pressure from being supplied to the wheel cylinders of the rear wheels, and when the master braking hydraulic pressure exceeds the reference hydraulic pressure, the controller may control the rear-wheel inlet valve so that braking hydraulic pressure is supplied to the wheel cylinders of the rear wheels within a range in which a difference between the reference hydraulic pressure and the master braking hydraulic pressure supplied to the wheel cylinders of the front wheels remains constant.

The controller may control the operation of the actuator based on information about relationship between a supply rate of brake oil to be supplied from the master cylinder for braking and entire braking force to be applied to the front wheels and the rear wheels, wherein the controller may open the rear-wheel inlet valve in an invalid stroke period of the master cylinder so as to minimize a difference between first relationship information obtained by measuring the relationship information in the pressure-increased state of the master cylinder and second relationship information obtained by measuring the relationship information in a pressure-reduced state of the master cylinder, the difference being caused by an invalid stroke of the master cylinder.

In accordance with various embodiments of the present invention, in a rear-wheel-drive vehicle to which regenerative braking cooperative control is applied, the braking force to be applied to the rear wheels may be limited by a predetermined valve installed on a flow path extending from a master cylinder to the rear wheels without using an expensive device for the rear-wheel regenerative braking cooperative control. Therefore, not only can the attitude stability of the vehicle be secured, but the production cost can also be reduced.

DESCRIPTION OF SPECIFIC EMBODIMENTS

Hereinafter, an embodiment of a brake apparatus for vehicles in accordance with the present invention will be described in detail with reference to the accompanying drawings. It should be noted that the drawings may be exaggerated in thickness of lines or sizes of components for convenience and clarity of description. Furthermore, the terms as used herein are defined by taking functions in the invention into account and can be changed according to the custom or intention of users or operators. Therefore, definition of the terms should be made according to the overall disclosures set forth herein.

Figure 1:
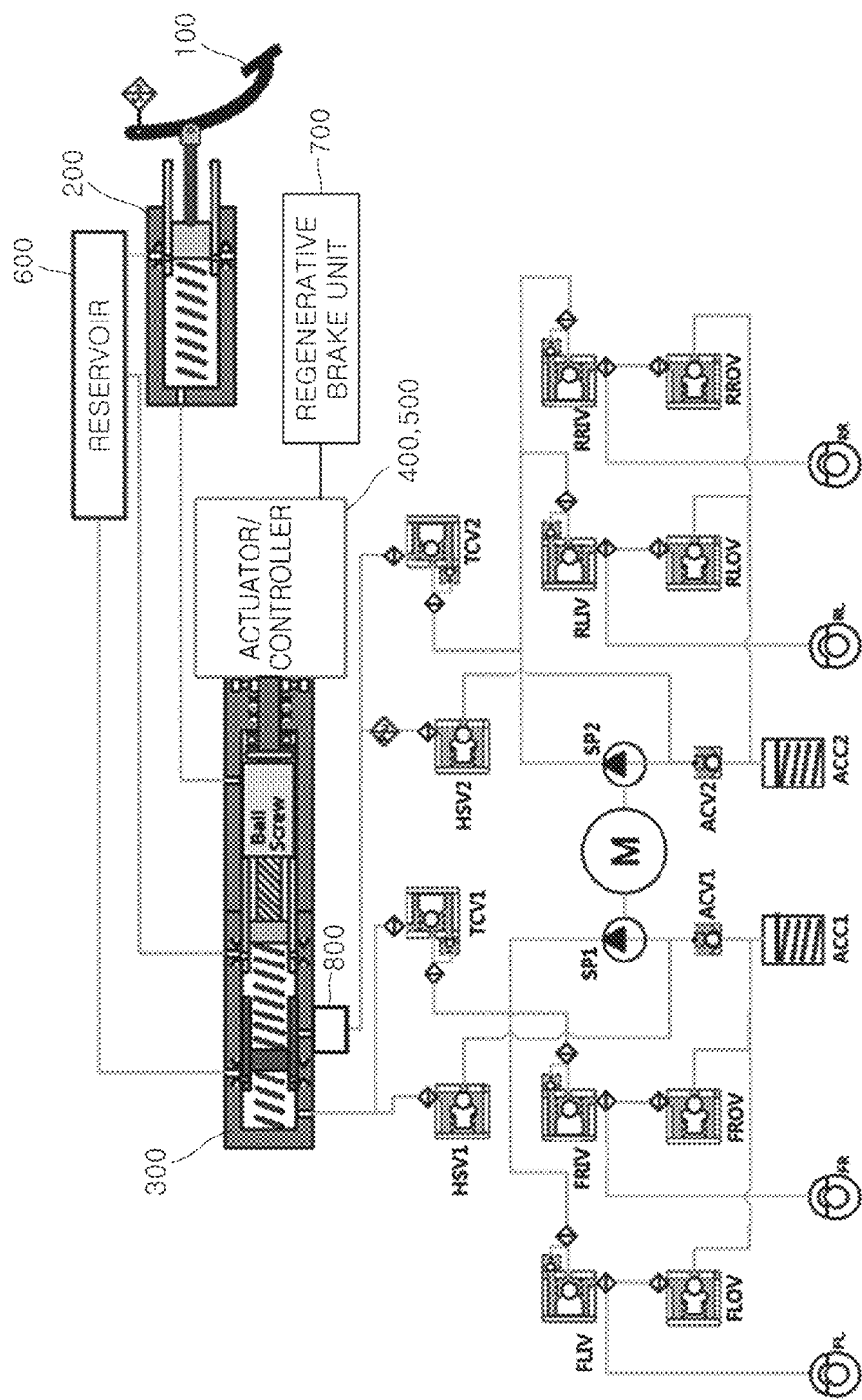
FIG. 1 is a diagram illustrating a brake apparatus for vehicles in accordance with an embodiment of the present invention.
Figure 2:
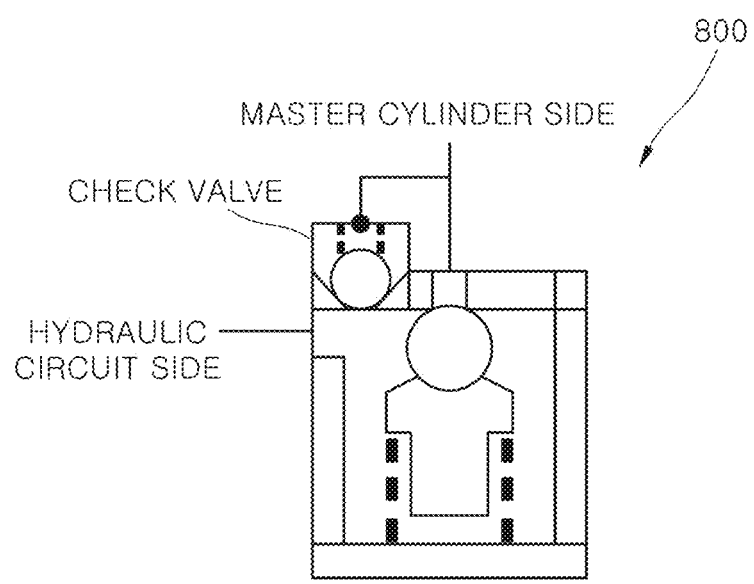
FIG. 2 is a diagram illustrating the structure of a valve unit of the brake apparatus for vehicles in accordance with an embodiment of the present invention.
Figure 3:
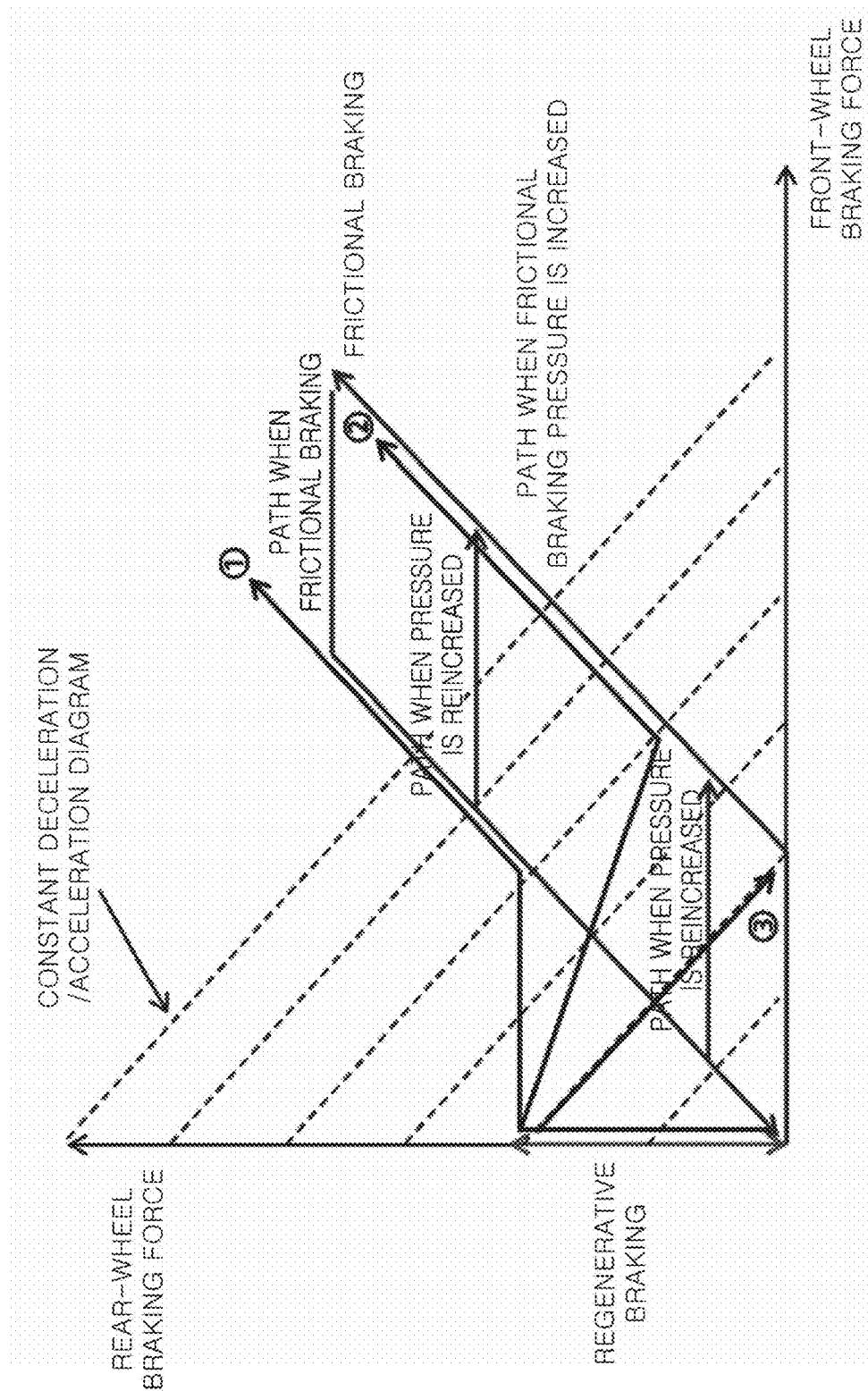
FIG. 3 is a braking force diagram illustrating the braking force when rear-wheel regenerative braking cooperative control is performed in the brake apparatus for vehicles in accordance with an embodiment of the present invention.
Figure 4:
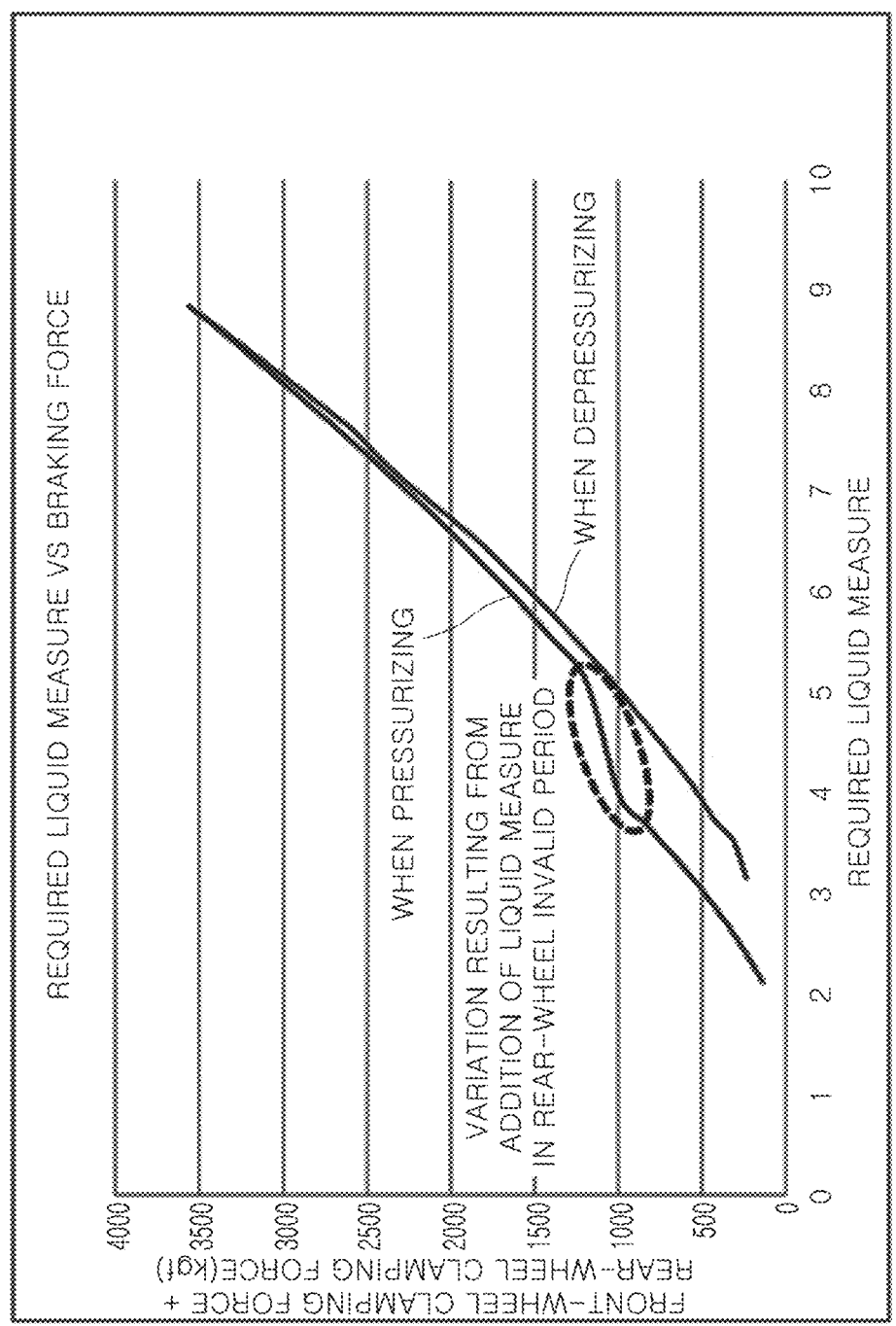
FIG. 4 is a diagram illustrating a difference between first and second relationship information which occurs due to an invalid stroke in the brake apparatus for vehicles in accordance with an embodiment of the present invention.
Figure 5:
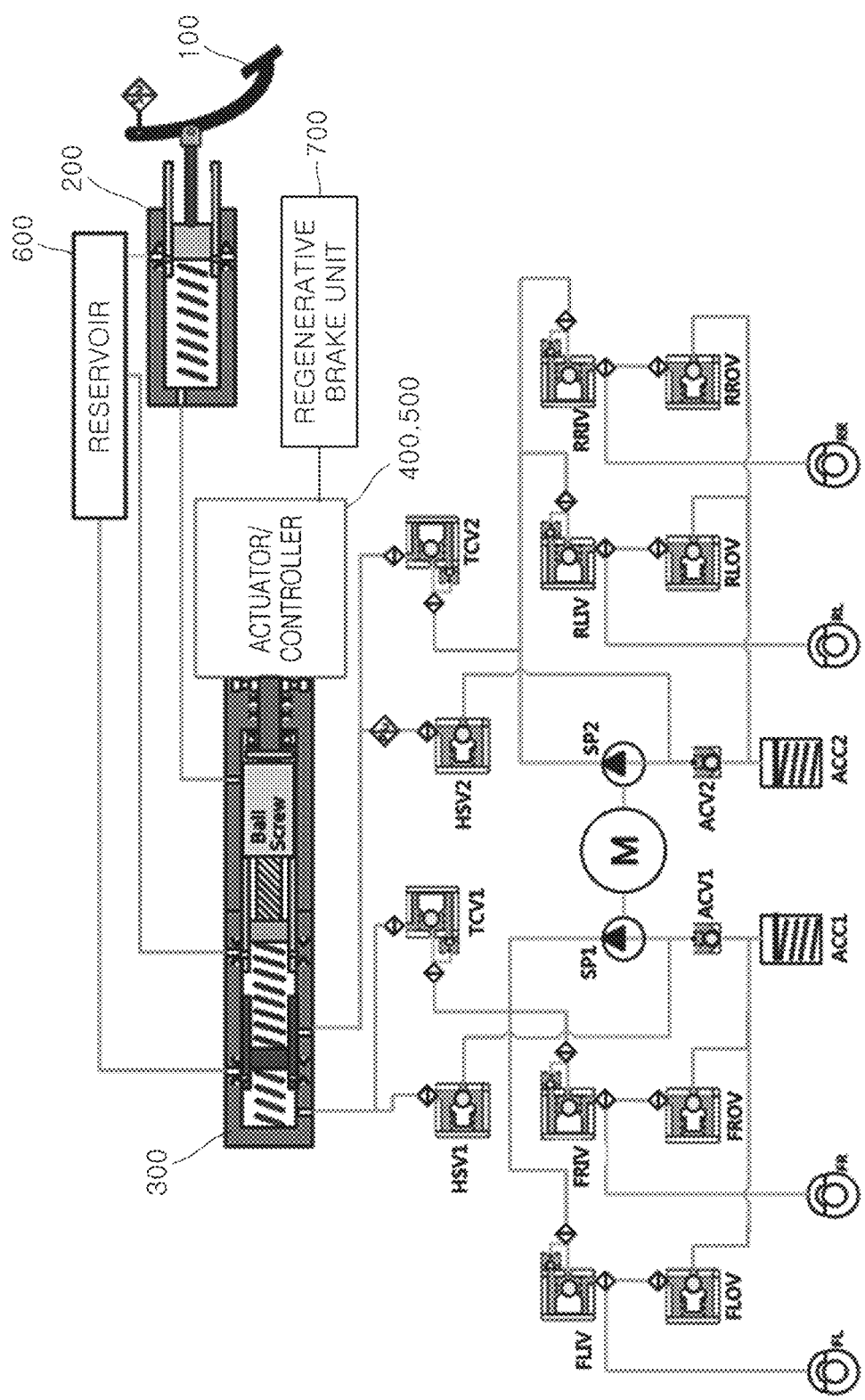
FIG. 5 is a diagram illustrating an example in which a valve unit is implemented as a rear-wheel inlet valve in the brake apparatus for vehicles in accordance with an embodiment of the present invention.
Figure 6:
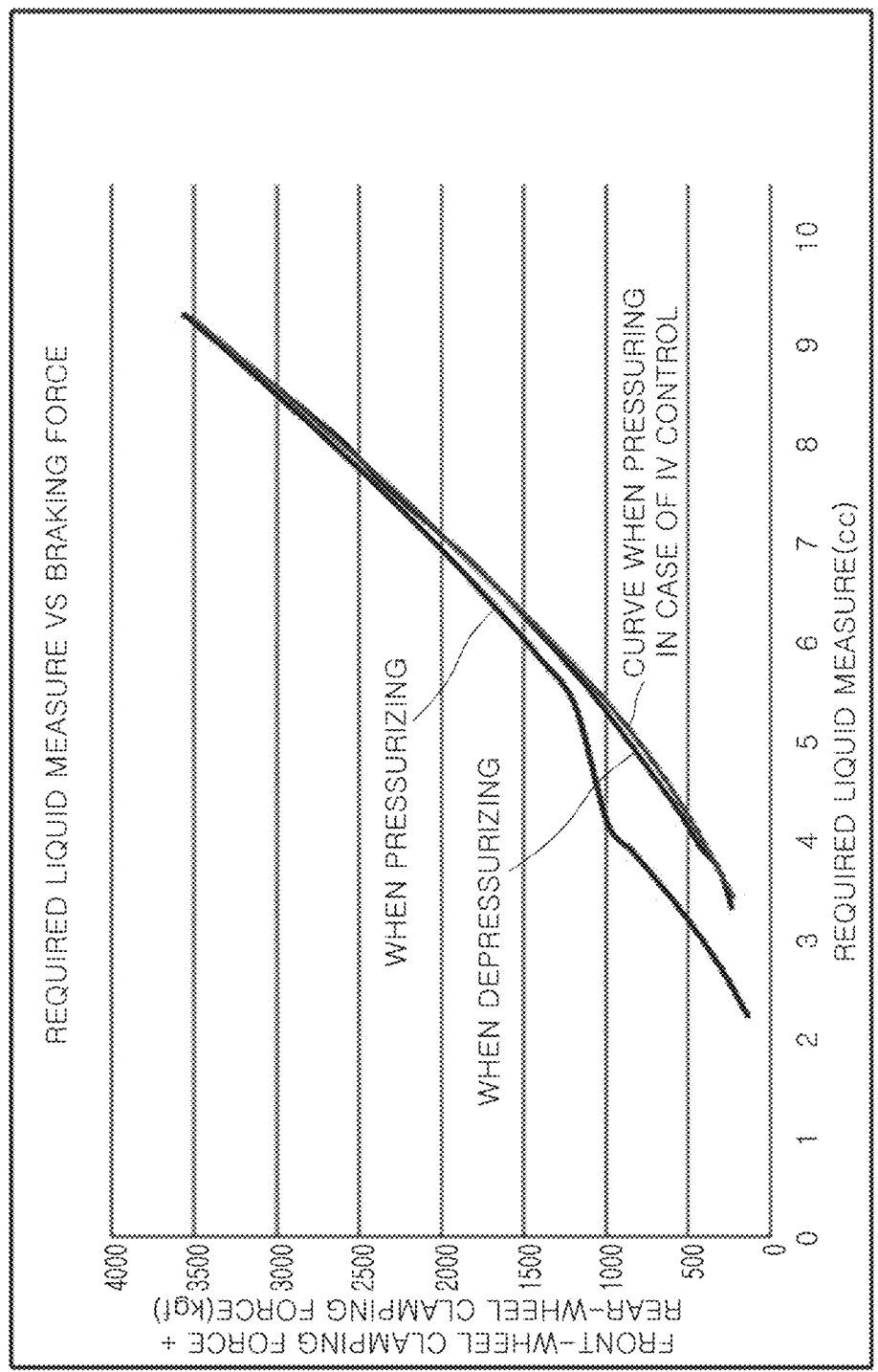
FIG. 6 is a diagram illustrating first and second relationship information in an example in which the valve unit is implemented as a rear-wheel inlet valve in the brake apparatus for vehicles in accordance with an embodiment of the present invention.

FIG. 1 is a diagram illustrating a brake apparatus for vehicles in accordance with an embodiment of the present invention. FIG. 2 is a diagram illustrating the structure of a valve unit of the brake apparatus for vehicles in accordance with an embodiment of the present invention. FIG. 3 is a braking force diagram illustrating the braking force when rear-wheel regenerative braking cooperative control is performed in the brake apparatus for vehicles in accordance with an embodiment of the present invention. FIG. 4 is a diagram illustrating a difference between first and second relationship information which occurs due to an invalid stroke in the brake apparatus for vehicles in accordance with an embodiment of the present invention. FIG. 5 is a diagram illustrating an example in which a valve unit is implemented as a rear-wheel inlet valve in the brake apparatus for vehicles in accordance with an embodiment of the present invention. FIG. 6 is a diagram illustrating first and second relationship information in an example in which the valve unit is implemented as a rear-wheel inlet valve in the brake apparatus for vehicles in accordance with an embodiment of the present invention.

The structure of the brake apparatus for vehicles in accordance with an embodiment of the present invention will be described in general with reference to FIG. 1.

As a brake pedal 100 is pressed by a driver, hydraulic pressure generated by a pedal cylinder 200 is transmitted to a master cylinder 300. The master cylinder 300 may form braking hydraulic pressure by the operation of an actuator 400 based on the hydraulic pressure transmitted from the pedal cylinder 200. The actuator 400 may be implemented as an electric booster which is operated under control of a controller 500 to be described below and is configured to move a ball screw (not illustrated) forward or backward. The master cylinder 300 forms braking hydraulic pressure using a piston which is pressed by or released from the ball screw that moves forward or backward. The braking hydraulic pressure formed by the master cylinder 300 will be referred to as "master braking hydraulic pressure".

The master braking hydraulic pressure is transmitted to a hydraulic pressure circuit. The hydraulic circuit will be described in general. Valves for controlling braking hydraulic pressure are installed on flow paths provided to supply the master braking hydraulic pressure to respective wheel cylinders FL, FR, RL, and RR of front wheels and rear wheels. In detail, traction control valves TCV1 and TCV2 configured to control the master braking hydraulic pressure are installed at an outlet side of the master cylinder 300. Inlet valves FLIV, FRIV, RLIV, and RRIV configured to control braking hydraulic pressure to be supplied to the wheel cylinders FL, FR, RL, and RR are installed on flow paths between the traction control valves TCV1 and TCV2 and the wheel cylinders FL, FR, RL, and RR. Furthermore, outlet valves FLOV, FROV, RLOV, and RROV configured to release braking hydraulic pressure formed in the wheel cylinders FL, FR, RL, and RR are installed at outlet sides of the wheel cylinders FL, FR, RL, and RR. Accumulators ACC1 and ACC2 configured to store brake oil discharged from the wheel cylinders FL, FR, RL, and RR are installed at outlet sides of the outlet valves FLOV, FROV, RLOV, and RROV. Hydraulic pumps SP1 and SP2 are provided to pump brake oil stored in the accumulators ACC1 and ACC2 and supply the brake oil to the wheel cylinders FL, FR, RL, and RR. A hydraulic motor M is provided to drive the hydraulic pumps SP1 and SP2. Check valves ACV1 and ACV2 are installed on flow paths between the hydraulic pumps SP1 and SP2 and the accumulators ACC1 and ACC2. High-pressure switch valves HSV1 and HSV2 are installed on flow paths between inlet sides of the hydraulic pumps SP1 and SP2 and the master cylinder 300.

The traction control valves TCV1 and TCV2 and the inlet valves FLIV, FRIV, RLIV and RRIV each may be a normal open type solenoid valve. The high-pressure switch valves HSV1 and HSV2 and the outlet valves FLOV, FROV, RLOV, and RROV each may be a normal close type solenoid valve. The controller 500 may control each valve in a pulse width modulation (PWM) duty control scheme by applying a driving current to each valve.

The above-mentioned brake apparatus for vehicles in accordance with this embodiment may be applied to a rear-wheel-drive vehicle to which the regenerative braking cooperative control is applied. Therefore, the brake apparatus for vehicles in accordance with this embodiment may include a regenerative brake unit 700 configured to perform a regenerative braking operation of a rear-wheel-drive vehicle. In detail, the regenerative brake unit 700 may include a battery (not illustrated), an electric motor (not illustrated), and a control unit (not illustrated) such as a hybrid control unit (HCU) (not illustrated). The battery may supply power to an electric motor while the vehicle runs, and store energy resulting from counter electromotive force generated by the electric motor during a regenerative braking operation. The electric motor may absorb inertial force of the vehicle that intends to move forward when the vehicle brakes, and perform the regenerative braking operation. The control unit may calculate possible regenerative braking torque, and control the vehicle to perform the regenerative braking operation.

According to the structure of the brake apparatus for vehicles in accordance with this embodiment, when the regenerative braking cooperative control is performed, braking force corresponding to frictional braking force (i.e., hydraulic braking force) is applied to the front wheels, and braking force obtained by the sum of frictional braking force and regenerative braking force is applied to the rear wheels. Therefore, wheel lock occurrence probability of the rear wheels is increased, whereby the attitude stability of the vehicle may deteriorate.

Given this, this embodiment may employ a configuration in which braking force to be applied to the rear wheels is restricted by a valve unit 800 to be described below so that the attitude stability of the rear-wheel-drive vehicle to which regenerative braking cooperative control is applied can be secured. Hereinafter, the configuration of this embodiment will be described in detail, focused on the valve unit 800.

First, the master cylinder 300 according to this embodiment may form master braking hydraulic pressure using the operation of the actuator 400 so as to apply, to the front wheels and the rear wheels of the rear-wheel-drive vehicle, frictional braking force determined by subtracting regenerative braking force generated by the regenerative brake unit 700 from braking force demanded by the driver. Here, the frictional braking force may be determined by the controller 500 to be described below. In other words, the controller 500 may sense braking demand of the driver through a pedal travel sensor (PTS) and determine braking force demanded by the driver. The controller 500 may determine frictional braking force to be applied to the front wheels and the rear wheels by subtracting regenerative braking force transmitted from the regenerative brake unit 700 from the determined demanded braking force. The controller 500 may drive the actuator 400 based on the determined frictional braking force, thus enabling the master cylinder 300 to form the master braking hydraulic pressure.

The valve unit 800 may adjust the master braking hydraulic pressure so that frictional braking force can be differentially applied to the front wheels and the rear wheels, whereby the braking force of the rear wheels may be restricted from being increased by the regenerative braking force applied to the rear wheels.

In detail, taking into account a ratio between the frictional braking force to be applied to the front wheels and the braking force of the rear wheels obtained by the sum of the regenerative braking force and the frictional braking force to be applied to the rear wheels, the valve unit 800 may restrict the braking force of the rear wheels such that preset braking distribution conditions are satisfied.

In other words, to secure the attitude stability of the vehicle, a distribution rate of braking force to be applied to the front wheels needs to be greater than a distribution rate of braking force to be applied to the rear wheels. To this end, the braking force distribution conditions may be set such that a distribution ratio between the braking force of the front wheels (i.e., the frictional braking force to be applied to the front wheels) and the braking force of the rear wheels (i.e., the sum of the regenerative braking force and the frictional braking force to be applied to the rear wheels) is 7:3. The valve unit 800 may be designed such that, during the regenerative braking cooperative control, braking force corresponding to the corresponding distribution rate (7) is applied to the front wheels, and braking force corresponding to the corresponding distribution rate (3) is applied to the rear wheels. Thereby, the attitude stability of the rear-wheel-drive vehicle may be secured.

To this end, in a pressure-increased state of the master cylinder 300, if the master braking hydraulic pressure is within a range equal to or less than a preset reference hydraulic pressure, the valve unit 800 may block braking hydraulic pressure from being supplied to the wheel cylinders RL and RR of the rear wheels, so that the master braking hydraulic pressure may be supplied to only the wheel cylinders FL and FR of the front wheels. If the master braking hydraulic pressure exceeds the reference hydraulic pressure, the valve unit 800 may allow braking hydraulic pressure to be supplied to the wheel cylinders RL and RR of the rear wheels within a range in which a difference between the reference hydraulic pressure and the master braking hydraulic pressure supplied to the wheel cylinders FL and FR of the front wheels remains constant. In detail, as illustrated in FIG. 1, the valve unit 800 may be installed on a flow path extending from the master cylinder 300 to the wheel cylinders RL and RR of the rear wheels. The valve unit 800 may be implemented as a normal close type valve which opens while a return spring is compressed when the master braking hydraulic pressure exceeds the reference hydraulic pressure.

In other words, as illustrated in FIG. 2, in a pressure-increased state of the master cylinder 300, if the master braking hydraulic pressure is within a range equal to or less than the reference hydraulic pressure, the valve unit 800 is closed by the return spring so that the braking hydraulic pressure to be supplied to the wheel cylinders RL and RR of the rear wheels is blocked, and the master braking hydraulic pressure is supplied to only the wheel cylinders FL and FR of the front wheels. If the master braking hydraulic pressure exceeds the reference hydraulic pressure, the return spring of the valve unit 800 is compressed so that the valve unit 800 opens. Hence, while the master braking hydraulic pressure is supplied to the wheel cylinders FL and FR of the front wheels, the braking hydraulic pressure is also supplied to the wheel cylinders RL and RR of the rear wheels. Here, the valve unit 800 may allow the braking hydraulic pressure to be supplied to the wheel cylinders RL and RR of the rear wheels within a range in which a difference between the reference hydraulic pressure and the master braking hydraulic pressure to be supplied to the wheel cylinders FL and FR of the front wheels remains constant. As the master braking hydraulic pressure increases within the range exceeding the reference hydraulic pressure, a compression rate of the return spring of the valve unit may be increased, and the degree of opening thereof may be increased, so that hydraulic pressure to be supplied to the wheel cylinders RL and RR of the rear wheels may be increased.

For example, on the assumption that the reference hydraulic pressure is set to 30 bar as the pressure-increased state of the master cylinder 300, if the master braking hydraulic pressure is within a range equal to or less than 30 bar, the valve unit 800 is closed, so that the master braking hydraulic pressure is supplied to only the wheel cylinders FL and FR of the front wheels. If the master braking hydraulic pressure reaches 50 bar, 50 bar corresponding to the master braking hydraulic pressure is supplied to the wheel cylinders FL and FR of the front wheels, and 20 bar corresponding to a difference between the reference hydraulic pressure and the master braking hydraulic pressure is supplied to the wheel cylinders RL and RR of the rear wheels.

The above-mentioned reference hydraulic pressure may be selected as various values (e.g., 30 bar), taking into account the range of the master braking hydraulic pressure required to typically perform a braking operation of the vehicle. In the case where the braking operation is performed using a master braking hydraulic pressure within the selected reference hydraulic pressure, the braking operation for the front wheels is performed by frictional braking, and the braking operation for the rear wheels is performed by regenerative braking.

Furthermore, the return spring of the valve unit 800 may be designed to have an appropriate elastic coefficient such that the return spring can be compressed when the master braking hydraulic pressure exceeds the reference hydraulic pressure, and braking hydraulic pressure can be supplied to the wheel cylinders RL and RR of the rear wheels within a range in which the difference between the master braking hydraulic pressure and the reference hydraulic pressure remains constant.

As illustrated in FIG. 2, the valve unit 800 may include a check valve configured to form a pressure reducing path for retrieving brake oil into the master cylinder 300 in a pressure-reduced state of the master cylinder 300. When the hydraulic pressure of the hydraulic circuit exceeds the hydraulic pressure of the master cylinder 300, the check valve may open to form the pressure reducing path for retrieving the brake oil into the master cylinder 300 (here, the check valve may include a return spring).

FIG. 3 is a braking force diagram illustrating the braking force when rear-wheel regenerative braking cooperative control is performed through the configuration of the present embodiment described above.

The red lines indicate a frictional braking force diagram. As described above, within a range equal to or less than the reference hydraulic pressure, the master braking hydraulic pressure is supplied to only the wheel cylinders FL and FR of the front wheels. In the case where the master braking hydraulic pressure increases to a value exceeding the reference hydraulic pressure, the valve unit 800 opens, and braking hydraulic pressures to be supplied to the respective wheel cylinders FL, FR, RL, and RR of the front and rear wheels also increase. Here, the braking hydraulic pressure to be supplied to the wheel cylinders RL and RR of the rear wheels maintains a difference between the reference hydraulic pressure and the mast braking hydraulic pressure to be supplied to the wheel cylinders FL and FR of the front wheels. The pressure-reduced state of the master braking hydraulic pressure will be described below.

The green line indicates a regenerative braking force diagram. In other words, the green line indicates the maximum regenerative braking force to be applied to the rear wheels during a braking operation.

The black lines indicate an entire braking force diagram. ① indicates the case where, after a braking operation has been performed using only the maximum regenerative braking force applied to the rear wheels, the frictional braking force increases while the maximum regenerative braking force is maintained. ② indicates the case where, after the braking operation has been performed using only the maximum regenerative braking force applied to the rear wheels, the frictional braking force increases while the regenerative braking force reduces, but the entire braking force that is the sum of the frictional braking force and the regenerative braking force increases. ③ indicates the case where, after the braking operation has been performed using only the maximum regenerative braking force applied to the rear wheels, the frictional braking force increases while the regenerative braking force reduces, but the entire braking force that is the sum of the frictional braking force and the regenerative braking force remains constant. In each of ① to ③, a y-axial difference between the entire braking force diagram along the black line and the frictional braking force diagram along the red line is determined to be regenerative braking force.

On the one hand, the controller 500 in accordance with an embodiment may control the operation of the actuator 400, based on information about relationship between a supply rate (a required liquid measure) of brake oil supplied from the master cylinder 300 for braking and the entire braking force to be applied to the front wheels and the rear wheels. In other words, the controller 500 may be operated to generate braking force through control in position of the actuator 400 based on the relationship information. Hence, the brake oil supply rate is an important factor to be considered in control in position of the actuator 400 because the brake oil supply rate determines a degree to which the piston of the master cylinder 300 advances.

Here, during a pressure reducing operation of the master cylinder 300, a pressure reducing path for retrieving brake oil into the master cylinder 300 is formed by the check valve. Since the check valve opens when the hydraulic pressure of the hydraulic circuit exceeds the hydraulic pressure of the master cylinder 300, as can be checked in the frictional braking force diagram of FIG. 3, a path of the braking force diagram when the master braking hydraulic pressure is increased and a path of the braking force diagram when the master braking hydraulic pressure is reduced differ from each other.

Therefore, there may be a difference between the relationship information when the pressure of the master cylinder 300 is increased and the relationship information when the pressure of the master cylinder 300 is reduced. This difference is because additional brake oil supply occurs due to an invalid stroke of the master cylinder 300 at a point in time at which braking hydraulic pressure begins to be transmitted to the wheel cylinders RL and RR of the rear wheels. Consequently, there is a need for the controller 500 to perform the position control of the actuator 400 taking into account the difference in relationship information.

To this end, the controller 500 may control the operation of the actuator 400 (i.e., perform the position control of the actuator 400), taking into account a difference between first relationship information obtained by measuring the relationship information in the pressure-increased state of the master cylinder 300 and second relationship information obtained by measuring the relationship information in the pressure-reduced state of the master cylinder 300, the difference being caused by the invalid stroke of the master cylinder 300. FIG. 4 illustrates an example of the first relationship information and the second relationship information.

In detail, the controller 500 may control the operation of the actuator 400 based on the first relationship information until the master braking hydraulic pressure increases and reaches the reference hydraulic pressure, and may control the operation of the actuator 400 based on the second relationship information after the master braking hydraulic pressure exceeds the reference hydraulic pressure.

As such, in the case where the valve unit 800 is installed on the flow path extending from the master cylinder 300 to the wheel cylinders RL and RR of the rear wheels and performs the regenerative braking cooperative control, an invalid stroke of the master cylinder 300 leads to a difference between the relationship information when the master cylinder 300 is increased in pressure and the relationship information when the master cylinder 300 is reduced in pressure. Therefore, in order to perform the position control of the actuator 400, there is a need to update previously set relationship information and determine a demand for the position control of the actuator 400.

Consequently, the controller 500 may generate first relationship information by measuring the relationship information in the pressure-increased state of the master cylinder 300, and generate second relationship information by measuring the relationship information in the pressure-reduced state of the master cylinder 300. Thereafter, the controller 500 may control the operation of the actuator 400 based on the first relationship information until the master braking hydraulic pressure reaches the reference hydraulic pressure, and may control the operation of the actuator 400 based on the second relationship information after the master braking hydraulic pressure exceeds the reference hydraulic pressure. Even when the master braking hydraulic pressure that has exceeded the reference hydraulic pressure is reduced below the reference hydraulic pressure, the controller 500 controls the operation of the actuator 400 based on the second relationship information.

Hitherto, there has been described the embodiments where the valve unit 800 is implemented as a mechanical valve which is a normal close type valve that is installed on the flow path extending from the master cylinder 300 to the wheel cylinders RL and RR of the rear wheels and opens while the return spring is compressed when the master braking hydraulic pressure exceeds the reference hydraulic pressure. However, the valve unit 800 in accordance with an embodiment of the present invention may be implemented as a configuration including the rear-wheel inlet valves RLIV and RRIV that control braking hydraulic pressure to be supplied to the wheel cylinders RL and RR of the rear wheels, instead of the mechanical valve, or may be implemented as a configuration in which the controller 500 controls the operation of the rear-wheel inlet valves RLIV and RRIV to adjust the braking hydraulic pressure to be supplied to the wheel cylinders RL and RR of the rear wheels so that the braking force of the rear wheels is restricted from being increased by regenerative braking force to be applied to the rear wheels. FIG. 5 illustrates an example in which the valve unit 800 is implemented as the rear-wheel inlet valves RLIV and RRIV.

That is, as described above, each of the rear-wheel inlet valves RLIV and RRIV may be implemented as a normal open type solenoid valve. The controller 500 may apply a driving current to each of the rear-wheel inlet valves RLIV and RRIV and thus control each valve in a PWM duty control scheme. In other words, unlike the above-mentioned embodiment having a mechanical structure, this embodiment may employ a scheme of electrically controlling the rear-wheel inlet valves RLIV and RRIV.

Based on this, the controller 500 may control the rear-wheel inlet valves RLIV and RRIV such that, in the pressure-increased state of the master cylinder 300, when the master braking hydraulic pressure is within a range equal to or less than the preset reference hydraulic pressure, the rear-wheel inlet valves RLIV and RRIV are closed to block braking hydraulic pressure to be supplied to the wheel cylinders RL and RR of the rear wheels, and, when the master braking hydraulic pressure exceeds the reference hydraulic pressure, braking hydraulic pressure is supplied to the wheel cylinders RL and RR of the rear wheels within a range in which a difference between the reference hydraulic pressure and the master braking hydraulic pressure to be supplied to the wheel cylinders FL and FR of the front wheels is maintained.

That is, with regard to the rear-wheel inlet valves RLIV and RRIV each of which may be implemented as a normal open type solenoid valve, the controller 500 may implement the above-mentioned configuration by applying, to the rear-wheel inlet valves RLIV and RRIV, a driving current having reference duty that the rear-wheel inlet valves RLIV and RRIV may be closed when the master braking hydraulic pressure is within a range equal to or less than the preset reference hydraulic pressure, and may open when the master braking hydraulic pressure exceeds the reference hydraulic pressure.

On the one hand, as described above, the controller 500 may control the operation of the actuator 400 based on information about relationship between a supply rate of brake oil to be supplied from the master cylinder 300 for braking and the entire braking force to be applied to the front wheels and the rear wheels. Here, the controller 500 may open the rear-wheel inlet valves RLIV and RRIV in an invalid stroke period of the master cylinder 300 so as to minimize a difference between first relationship information obtained by measuring the relationship information in the pressure-increased state of the master cylinder 300 and second relationship information obtained by measuring the relationship information in the pressure-reduced state of the master cylinder 300, the difference being caused by the invalid stroke of the master cylinder 300.

Unlike the embodiment in which a separate mechanical valve is installed on the flow path extending from the master cylinder 300 to the wheel cylinders RL and RR of the rear wheels to perform the regenerative braking cooperative control, if the rear-wheel inlet valves RLIV and RRIV are employed as the valve unit 800, the controller 500 may open the rear-wheel inlet valves RLIV and RRIV in the invalid stroke period of the master cylinder 300, thus minimizing a difference between the first relationship information obtained by measuring the relationship information in the pressure-increased state of the master cylinder 300 and the second relationship information obtained by measuring the relationship information in the pressure-reduced state of the master cylinder 300. Therefore, the demand for the position control of the actuator 400 may be easily set. FIG. 6 illustrates that the difference between the first relationship information and the second relationship information may be minimized by a control operation of opening the rear-wheel inlet valves RLIV and RRIV during the invalid stroke period.

As described, in a rear-wheel-drive vehicle, to which regenerative braking cooperative control is applied, in accordance with various embodiments of the present invention, the braking force to be applied to the rear wheels may be limited by a predetermined valve installed on a flow path extending from a master cylinder to the rear wheels without using an expensive device for the rear-wheel regenerative braking cooperative control. Therefore, not only can the attitude stability of the vehicle be secured, but the production cost can also be reduced.

While the present invention has been described with reference to the specific embodiment illustrated in the attached drawings, this is only for illustrative purposes, and it will be apparent to those skilled in the art that various modifications and other equivalent embodiments may be made without departing from the spirit and scope of the invention as defined in the following claims. Therefore, the technical scope of the present invention must be defined by the accompanying claims.

What is claimed is:

1. A brake apparatus for vehicles comprising:
a regenerative brake unit configured to perform a regenerative braking operation of a rear-wheel-drive vehicle that comprises front wheels and rear wheels, wherein the regenerative brake unit is configured to apply regenerative braking force to the rear wheels;
a master cylinder configured to form master braking hydraulic pressure using an operation of an actuator to apply frictional braking force to the front wheels and the rear wheels; and
a valve unit configured to adjust braking hydraulic pressure to be supplied to the rear wheels from the master cylinder so that the frictional braking force is differentially applied to the front wheels and the rear wheels,
wherein the brake apparatus further comprises a controller configured to control the operation of the actuator, based on information about relationship between a supply rate of brake oil supplied from the master cylinder for braking and entire braking force to be applied to the front wheels and the rear wheels, and
wherein the controller is configured to control the operation of the actuator, taking into account a difference between first relationship information obtained by measuring the relationship information in the pressure-increased state of the master cylinder and second relationship information obtained by measuring the relationship information in the pressure-reduced state of the master cylinder, the difference being caused by an invalid stroke of the master cylinder.

2. The brake apparatus according to claim 1, wherein the valve unit is configured to adjust the frictional braking force of the rear wheels such that preset braking distribution conditions are satisfied, taking into account a ratio between the frictional braking force to be applied to the front wheels and a sum of the regenerative braking force and the frictional braking force to be applied to the rear wheels.

3. The brake apparatus according to claim 1, wherein, in a pressure-increased state of the master cylinder, when the master braking hydraulic pressure is within a range equal to or less than a preset reference hydraulic pressure, the valve unit is configured to block braking hydraulic pressure from being supplied to wheel cylinders of the rear wheels, so that the master braking hydraulic pressure is supplied to only wheel cylinders of the front wheels, and when the master braking hydraulic pressure exceeds the preset reference hydraulic pressure, the valve unit is configured to allow the braking hydraulic pressure to be supplied to the wheel cylinders of the rear wheels so that a difference between the braking hydraulic pressure supplied to the wheel cylinders of the rear wheels and the master braking hydraulic pressure supplied to the wheel cylinders of the front wheels remains to be the preset reference hydraulic pressure.

4. The brake apparatus according to claim 3, wherein the valve unit is installed on a flow path extending from the master cylinder to the wheel cylinders of the rear wheels, and is a normal close type valve which opens while a return spring is compressed when the master braking hydraulic pressure exceeds the preset reference hydraulic pressure.

5. The brake apparatus according to claim 3, wherein the valve unit comprises a check valve configured to form a pressure reducing path for retrieving brake oil into the master cylinder in a pressure-reduced state of the master cylinder.

6. The brake apparatus according to claim 1, wherein the controller is configured to control the operation of the actuator based on the first relationship information until the master braking hydraulic pressure increases and reaches a preset reference hydraulic pressure, and control the operation of the actuator based on the second relationship information after the master braking hydraulic pressure exceeds the preset reference hydraulic pressure.

7. The brake apparatus according to claim 1, wherein the valve unit comprises a rear-wheel inlet valve configured to control braking hydraulic pressure to be supplied to the wheel cylinders of the rear wheels,
wherein the controller is configured to control an operation of the rear-wheel inlet valve to adjust the braking hydraulic pressure to be supplied to the wheel cylinders of the rear wheels, and to restrict the braking force of the rear wheels from being increased by regenerative braking force to be applied to the rear wheels.

8. The brake apparatus according to claim 7, wherein, in a pressure-increased state of the master cylinder, when the master braking hydraulic pressure is within a range equal to or less than a preset reference hydraulic pressure, the controller is configured to close the rear-wheel inlet valve to block braking hydraulic pressure from being supplied to the wheel cylinders of the rear wheels, and when the master braking hydraulic pressure exceeds the preset reference hydraulic pressure, the controller is configured to control the rear-wheel inlet valve to supply the braking hydraulic pressure to the wheel cylinders of the rear wheels so that a difference between the braking hydraulic pressure supplied to the wheel cylinders of the rear wheels and the master braking hydraulic pressure supplied to the wheel cylinders of the front wheels remains to be the preset reference hydraulic pressure.

9. The brake apparatus according to claim 8, wherein the controller is configured to control the operation of the actuator based on information about relationship between a supply rate of brake oil to be supplied from the master cylinder for braking and entire braking force to be applied to the front wheels and the rear wheels, wherein the controller is configured to open the rear-wheel inlet valve in an invalid stroke period of the master cylinder so as to minimize a difference between first relationship information obtained by measuring the relationship information in the pressure-increased state of the master cylinder and second relationship information obtained by measuring the relationship information in a pressure-reduced state of the master cylinder, the difference being caused by an invalid stroke of the master cylinder.

* * * * *